Dec. 1, 1925.　　　　　　　　　　　　　　1,563,559
W. A. FREDERICK
INTAKE MANIFOLD HEATER
Filed March 16, 1922
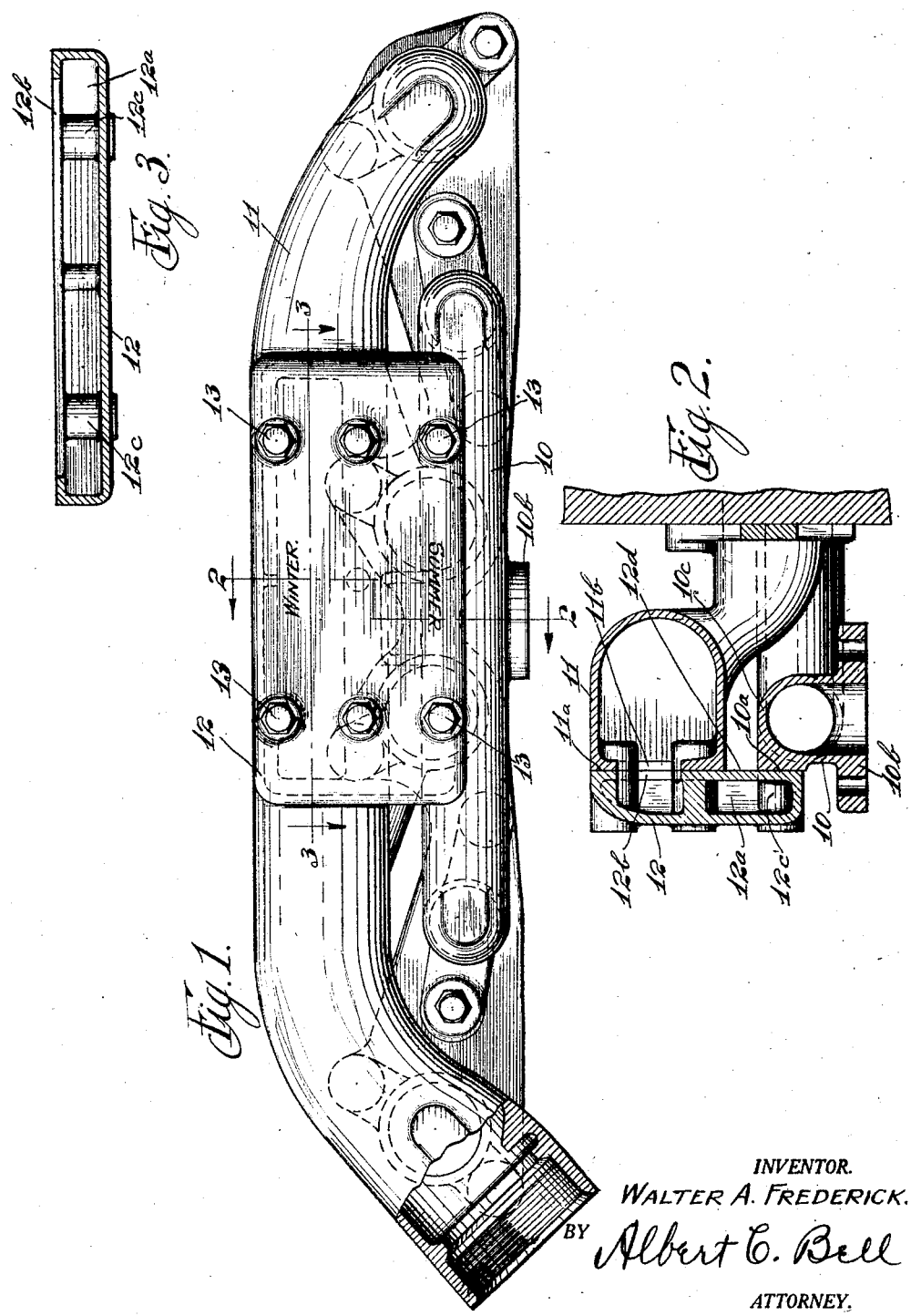
INVENTOR.
WALTER A. FREDERICK.
BY Albert E. Bell
ATTORNEY.

Patented Dec. 1, 1925.

1,563,559

UNITED STATES PATENT OFFICE.

WALTER A. FREDERICK, OF DETROIT, MICHIGAN, ASSIGNOR TO CONTINENTAL MOTORS CORPORATION, OF DETROIT, MICHIGAN, A CORPORATION OF VIRGINIA.

INTAKE-MANIFOLD HEATER.

Application filed March 16, 1922. Serial No. 544,081.

*To all whom it may concern:*

Be it known that I, WALTER A. FREDERICK, a citizen of the United States, residing at Detroit, in the county of Wayne and State of Michigan, have invented a new and useful Improvement in Intake-Manifold Heaters, of which the following is a specification.

My invention relates to an improved constrution for heating intake manifolds for internal combustion engines by heat derived from the exhaust manifolds. By my construction I provide a heat communicating or transferring member constructed to engage both the intake and the exhaust manifolds in a manner to transfer the heat from the exhaust manifold to the intake manifold particularly at the point where the direction of flow of the gases in the intake manifold changes abruptly, since this is the point in the intake manifold where precipitation of the heavier constituents of the fuel is most apt to occur. By my invention I further construct the member referred to in the form of a hollow plate having an opening along one edge for communicating with a corresponding opening in the exhaust manifold to permit the hot exhaust gases to enter the plate and thus most effectively heat the lower part of the member and therefore the intake manifold. The parts are proportioned so that this relation may be secured when it is most necessary to heat the intake manifold, or in other words during cold weather. This degree of heating however, would be excessive in warm weather since it would then heat the mixture in the intake manifold to a greater degree than necessary to maintain the heavier constituents of the fuel in vaporized condition and there would be a corresponding loss in volumetric efficiency. To eliminate this I construct the said member so that it may be secured to the two manifolds in reversed relation, that is to say with its previous lower edge, uppermost. In this position the opening in the face of the said member is not in alignment with the corresponding opening in the exhaust manifold but is entirely below said opening and the remaining portion of the face of the said member covers and completely closes the opening in the exhaust manifold thus preventing the exhaust gases from entering said member. For this relation of the parts the said member is heated much less effectively but still sufficiently to heat the intake manifold to the degree required for warm weather operation. By my invention I further provide simple means for securing the said member in place so that it may readily be removed and secured to the manifolds in either desired relation.

My invention will best be understood by reference to the accompanying drawings showing a preferred embodiment thereof in which—

Fig. 1 shows an intake manifold and an exhaust manifold in elevation with the heat conducting member secured thereto, Fig. 2 is a sectional view of the parts shown in Fig. 1 taken along the line 2—2 and Fig. 3 is a sectional view through the heat communicating member taken along the line 3—3 in Fig. 1.

Similar numerals refer to similar parts throughout the several views.

As shown in the drawings an intake manifold 10 is located below an exhaust manifold 11 and in such position that vertical faces $10^a$ and $11^a$ of said manifolds lie in the same vertical plane. A hollow plate or member 12 is provided with a flat face for engaging the corresponding faces $10^a$ and $11^a$ of the manifolds and the compartment $12^a$ in said plate is provided with a rectangular opening $12^b$ through said face which is in alignment with a corresponding opening $11^b$ through the face $11^a$ of the exhaust manifold when the plate is secured to the manifolds in the relation indicated in Figs. 1 and 2. The plate 12 is secured to the manifolds by screws 13 which extend through corresponding bosses $12^c$ through the compartment $12^a$ of the plate. It will be understood that with the exception of these bosses the compartment $12^a$ extends from end to end of the plate and from top to bottom thereof.

The intake manifold 10 is provided with a carburetor connection $10^b$ below the mid-portion of the plate 12 so that the wall $10^c$ of said manifold against which the gases are projected as they enter through the connection $10^b$ to change their direction of flow to the two branches of the manifold, is closely related to the mid-portion of the lower part of the plate 12.

In operation with the plate in the relation shown in Figs. 1 and 2, the exhaust gases pass freely through the openings 11ᵇ and 12ᵇ and into the compartment 12ᵃ of the plate and thus effectively heat the lower portion of the plate and the wall 10ᶜ of the intake manifold. The parts are preferably so proportioned and designed that the amount of this heating will be sufficient to maintain the fuel in vaporized condition for operation of the device in cold weather. This degree of heating in warm weather would be considerably more than required and result in a loss of volumetric efficiency due to heating the mixture unduly. To avoid this the plate is removed from the manifolds by removing the screws 13 and it is then reversed so that its lower edge shown in the drawings is uppermost and so that the wall 12ᵈ of the plate covers and closes the opening 11ᵇ through the exhaust manifold, the spacing of screws 13 being such that they enter the threads formed therefor in the manifolds for either relation of the plate. For the last described relation of the plate the heating of the plate is limited to that resulting from conduction from the exhaust manifold since the exhaust gases cannot enter the compartment in the plate, but this degree of heating is sufficient to heat the intake manifold sufficiently to vaporize the fuel for warm weather operation. For convenience the words Winter and Summer may be stamped or cast upon the plate as indicated in Fig. 1, to assist the user in placing the plate in proper relation for the particular prevailing weather conditions, it being understood that the relation of the plate is secured corresponding to the weather conditions indicated by the one of the words which is in proper position to be read when the plate is secured to the manifolds, or that any desired indications may be used.

While I have shown my invention in the particular embodiment above described it will be understood that I do not limit myself to this exact construction, as I may employ equivalents known to the art at the time of the filing of this application without departing from the scope of the appended claims.

What I claim is:

1. The combination of an intake manifold, an exhaust manifold, a member, said member being adjustably mounted on and engaging both manifolds in the different positions of adjustment of said member, and devices for securing said member in engagement with said manifolds in two relations, said member being hollow and having an opening through one wall opposite said exhaust manifold and said exhaust manifold having an opening therethrough in alignment with said opening in said member for one relation of said member to said manifolds, said opening in said exhaust manifold being closed by said member when secured to said manifolds in its other relation thereto.

2. The combination, with an intake manifold, of an exhaust manifold having an apertured side wall, and a hollow conducting member, said member being adjustably mounted on said manifolds and having an aperture through one of its walls and having an engaging surface adapted to interchangeably engage the intake and the exhaust manifolds in the different positions of adjustment of said member so that in one position the apertures align to admit exhaust gases to said hollow conducting member, and in the other position a wall of the conducting member covers the aperture in the exhaust manifold to exclude the exhaust gases from said hollow conducting member.

3. The combination with an intake manifold and an exhaust manifold of a hollow conducting member, said member being adjustably mounted on and having two surfaces for interchangeably engaging said manifolds in the different positions of adjustment of said member, one of said surfaces being apertured to communicate with the interior of said member and the other of said surfaces being imperforate, said member in one of its positions of engagement presenting said apertured surface to said exhaust manifold and in its other position of engagement presenting said imperforate surface to said exhaust manifold.

4. A hollow conducting member, said member adapted to be adjustably mounted on and having two surface portions for interchangeably engaging an exhaust manifold and an intake manifold in the different positions of adjustment of said member, one of said surface portions having an aperture communicating with the interior of said member and the other of said surface portions being imperforate.

In witness whereof, I hereunto subscribe my name this 6th day of March, A. D. 1922.

WALTER A. FREDERICK.